United States Patent
Huebner

(10) Patent No.: US 9,474,260 B2
(45) Date of Patent: Oct. 25, 2016

(54) RELEASE WEIGHT

(71) Applicant: Peter Booth Huebner, Cape Coral, FL (US)

(72) Inventor: Peter Booth Huebner, Cape Coral, FL (US)

(*) Notice: Subject to any disclaimer, the term of this patent is extended or adjusted under 35 U.S.C. 154(b) by 175 days.

(21) Appl. No.: 14/446,134

(22) Filed: Jul. 29, 2014

(65) Prior Publication Data

US 2015/0027030 A1   Jan. 29, 2015

Related U.S. Application Data

(60) Provisional application No. 61/859,408, filed on Jul. 29, 2013.

(51) Int. Cl.
*A01K 95/00* (2006.01)
*A01K 97/00* (2006.01)

(52) U.S. Cl.
CPC ..................... *A01K 97/00* (2013.01)

(58) Field of Classification Search
CPC .......... A91J 83/00; A91J 85/02; A91J 95/00; A91J 95/005; A91J 95/02; A91J 97/00
See application file for complete search history.

(56) References Cited

U.S. PATENT DOCUMENTS

| | | | | |
|---|---|---|---|---|
| 252,628 A * | 1/1882 | Smith | A01K 85/16 | 43/42.23 |
| 456,776 A * | 7/1891 | Prior | A01K 83/02 | 43/36 |
| 1,103,707 A * | 7/1914 | Threm | A01K 85/00 | 43/44.81 |
| 2,791,060 A * | 5/1957 | Kender | A01K 91/053 | 43/43.15 |
| 2,988,395 A * | 6/1961 | Rogers | B64D 17/383 | 294/82.25 |
| 3,001,259 A * | 9/1961 | Scheemaeker | A44B 9/12 | 24/710 |
| 3,815,274 A * | 6/1974 | Schleif | A01K 85/02 | 43/42.1 |
| 4,023,303 A * | 5/1977 | Maunu | A01K 97/18 | 43/53.5 |
| 4,803,798 A * | 2/1989 | Hannah | A01K 95/00 | 43/42.36 |
| 4,819,366 A * | 4/1989 | Manno | A01K 85/00 | 43/42.39 |
| 5,373,658 A * | 12/1994 | Huppert | A01K 85/00 | 43/42.37 |
| 5,887,380 A * | 3/1999 | Matlock | A01K 85/00 | 43/42.74 |
| 5,901,494 A * | 5/1999 | Reed | A01K 95/00 | 43/42.38 |
| 6,421,949 B1 * | 7/2002 | Schytte | A01K 91/06 | 43/43.12 |
| 6,519,895 B1 * | 2/2003 | Bennett | A01K 85/00 | 43/42.39 |
| 6,640,486 B1 * | 11/2003 | Rigney | A01K 85/02 | 43/42.37 |
| 7,036,266 B2 * | 5/2006 | Falcon | A01K 85/00 | 43/44.81 |
| D534,237 S * | 12/2006 | Shelton | D22/144 | |
| 7,874,096 B2 * | 1/2011 | Callaway | A01K 97/00 | 43/1 |
| 8,806,800 B2 * | 8/2014 | Hupp | A01K 97/00 | 43/4 |
| 8,943,740 B1 * | 2/2015 | Rathje, Jr. | A01K 97/06 | 43/57.2 |
| 9,185,891 B2 * | 11/2015 | Nakamichi | A01K 83/00 | |
| 9,241,479 B2 * | 1/2016 | Poston | A01K 97/00 | |
| 2004/0172874 A1 * | 9/2004 | Minegar | A01K 85/02 | 43/35 |
| 2013/0067794 A1 * | 3/2013 | Hunter | A01K 95/02 | 43/44.81 |

* cited by examiner

*Primary Examiner* — Christopher P Ellis
*Assistant Examiner* — Michael Wang
(74) *Attorney, Agent, or Firm* — George F. Wallace

(57) ABSTRACT

A release weight includes a weighted element having a flat bottom portion and a top portion having a connection element; an attachment hook having a first portion connected to the weighted element and a second portion connected to the first portion; and an extension element connected to the connection element. The attachment hook is passed through the jaw of the fish and the fish is placed in the body of water. The weighted element and the fish sink to the floor of a body of water, the flat bottom portion is flatly positioned on the floor, and the attachment hook is disengaged from the fish.

12 Claims, 2 Drawing Sheets

RELEASE WEIGHT

RELATED DOCUMENTS

This document is related to, incorporates in its entirety, and claims the priority benefit of the U.S. Provisional Patent Application Ser. No. 61/859,408, entitled "Release Weight," and filed on Jul. 29, 2013 by Peter Booth Huebner.

Field of the Invention

The present invention relates to release weights within a fishing environment.

BACKGROUND OF THE INVENTION

A release weight is a tool used in the fishing art to assist in returning undersized or unwanted fish to lower water depths to increase the survival rate of the fish. Particular benefits of using a release weight can include returning a fish back to its habitat quickly; re-pressurization of the fish to reduce the adverse effects of barotraumas; and reducing surface and mid-depth exposure to predators.

Prior release weights have included a weighted element; an attachment element, such as a hook or clamp; and an extension element, such as fishing filament, connected to the attachment element. After engaging the attachment element with a fish by piercing or clamping to the mouth of the fish, the fish can be subsequently placed in a body of water and the weighted element can assist in "sinking" the fish to a particular depth, at which point the attachment element can be disengaged from the fish by escape forces of the fish and/or motion of the release weight via the extension element. The release weight can then be pulled back to the surface of the water for subsequent use.

Prior release weights have suffered from several disadvantages. For example, prior release weights have been susceptible to undesirable "snagging" onto rocks, coral, and other underwater structures due to rigid attachment hooks, weighted elements having sharp and/or squared ridges, and overall shapes that do not facilitate an upright orientation of a release weight when reaching the bottom of a body of water, one or more of which can result in the loss of release weights and/or undesirable releases of fish (e.g., unsuccessful or untimely). Additionally, prior release weights have lacked structural aspects that facilitate an upright position of the release weight when the release weight reaches the floor of a body of water. Further, prior release weights have lacked safety features to minimize the risk of injury from sharp portions of attachment elements.

SUMMARY OF THE INVENTION

It is an object of the present invention is to provide a release weight.

It is another object of the present invention to provide a release weight that overcomes at least one deficiency in the prior art.

The present invention is disclosed herein as a release weight having a plurality of embodiments, which are to be broadly interpreted via the disclosure herein.

It should be noted that this disclosure includes a plurality of elements and/or aspects, and such elements and/or aspects need not necessarily be interpreted as being conjunctively required by one or more embodiments of the present invention. Rather, all combinations of the one or more elements and/or aspects can enable a separate embodiment of the present invention, which may be claimed with particularity in one or more future filed Non-Provisional Patent Applications. Moreover, any particular materials, structures, and/or sizes disclosed herein are to be construed strictly as illustrative and enabling, and not necessarily limiting. Therefore, it is expressly set forth that such materials, structures, and/or sizes independently or in any combination of one of more thereof, are merely illustratively representative of one or more embodiments of the present invention and are not to be construed as necessary in a strict sense.

Further, to the extent the same element or limitation is defined differently anywhere within this disclosure, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

In an exemplary embodiment of the present invention, a release weight for returning a fish having a jaw to a floor of a body of water can include a weighted element; an attachment hook; and an extension element.

In an exemplary aspect of the invention, a weighted element can include a flat bottom portion and a top portion, with the top portion having a connection element.

In another exemplary aspect, an attachment hook can have a first portion connected to the weighted element, and a second portion connected to the first portion, with the second portion being configured to pass through the jaw of a fish and the first and second portions creating an angle therebetween of between 0 and 360°.

In a further exemplary aspect, an extension element can be connected to the connection element to allow a user to lower and raise the release weight within the body of water.

In yet another exemplary aspect, the attachment hook can be passed through the jaw of a fish, and the fish can be then placed in the body of water. The weighted element and the fish can then sink to the floor of the body of water with the flat bottom portion being flatly positioned on the floor (initially or subsequently via manipulation of an extension element), such that the weighted element is in an upright position with the extension element extending upwardly towards the surface, and the attachment hook can be disengaged from the fish.

In further exemplary aspects, the attachment hook can be generally u-shaped, the weighted element can have at least one rounded side, and the weighted element can have a rounded top portion.

In another exemplary embodiment of the present invention, a release weight can further include a safety ring that can be disposed around the first and second portions of the attachment hook to bias the second portion towards the weighted element, which can minimize the risk of injury arising from a user being punctured by the attachment hook.

In another exemplary embodiment of the present invention, a safety ring can be disposed around the second portion and the weighted element to bias the second portion towards the weighted element, as noted above.

In another exemplary embodiment of the present invention, a safety ring can be cylindrical.

In another exemplary embodiment of the present invention, an attachment hook can include a third portion that can be connected to the second portion and can be at least substantially parallel with a length of the weighted element. Accordingly, the third portion can pass through the jaw of the fish. Further, a third portion can be utilized in the same or similar manner as a second portion as described herein.

DETAILED DESCRIPTION

Figure 1:
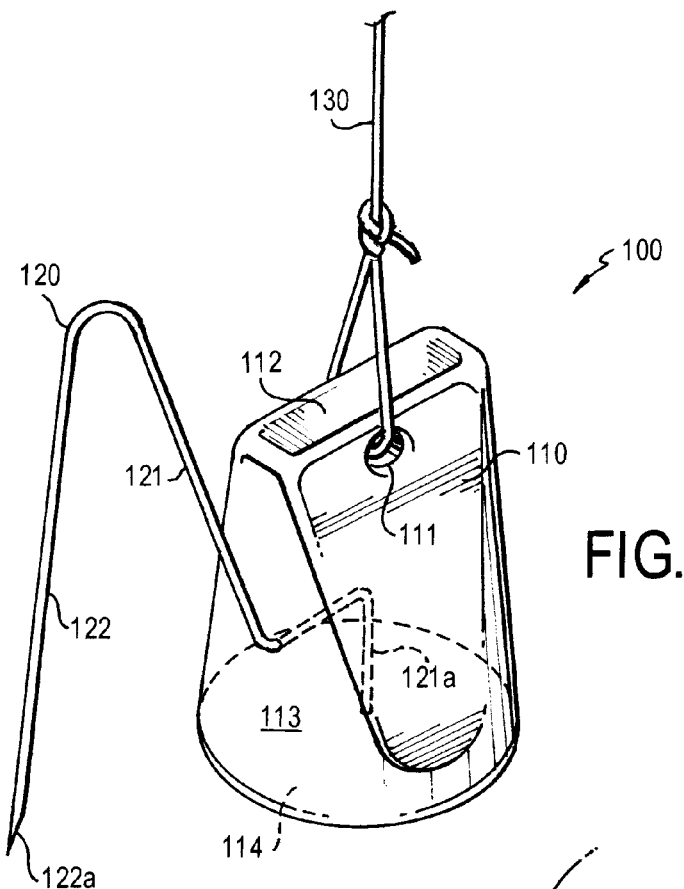
FIG. 1 illustrates an exemplary release weight having a weighted element, an attachment hook, and an extension element.

FIG. 1 illustrates an exemplary embodiment of the present invention, in which a release weight 100, for returning a fish to a desired depth within a body of water, can include a weighted element 110, an attachment hook 120, and an extension element 130.

In an exemplary aspect of the present invention, weighted element 110 can be provided in any desired shape, size, and/or weight, the particularities of which will be apparent to one of ordinary skill in the art, given the size and weight of an anticipated fish, as well as the desired speed in which a fish is to be returned to a desired depth. For example and not in limitation, weighted element 110 can have a weight of about one (1) pound. Further, weighted element 110 can be formed from any one or more materials insofar as the same is functionally compatible with the present invention. In an exemplary aspect, weighted element 110 can be formed from any one or more of lead, zinc, brass, etc., for example and not in limitation. In another exemplary aspect, weighted element 110 can be formed of a material having a specific gravity greater than 1.0.

In another exemplary aspect, as illustrated in FIG. 1, weighted element 110 can be provided with a rounded or flat top portion 112 and/or at least one rounded side 113, one or more of which can reduce the risk of weighted element 110 becoming permanently "snagged" on an underwater structure and thereafter lost.

Figure 2:
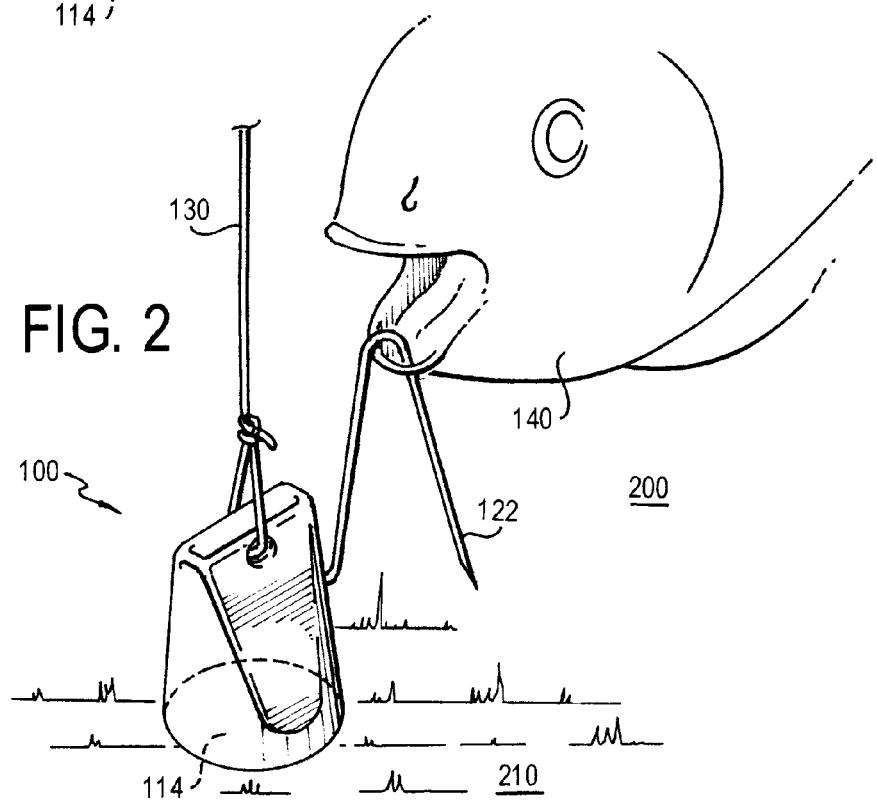
FIG. 2 illustrates an exemplary release weight having an exemplary attachment hook disposed through a jaw of a fish.

In another exemplary aspect, as illustrated in FIGS. 1 and 2, weighted element 110 can be provided with a flat, or substantially flat, bottom 114, which can particularly orient release weight 100 in an upright position when the release weight reaches the bottom surface 210 of a body of water 200. By so orienting weighted element 110, attachment hook 120 can be strategically oriented such that a second portion 122 (or third portion 123, if so provided and as discussed infra) of the attachment hook is facing downwardly, which can facilitate the releasing of a fish 140 from the attachment hook.

In a further exemplary aspect of the present invention, attachment hook 120 can be provided with a first portion 121 and a second portion 122. In one exemplary embodiment, attachment hook 120 can be provided with a u-shape, which according to the present invention can include any shape being at least similar to a "U" shape, including but not limited to a "V" shape.

In yet another exemplary aspect of the present invention, attachment hook 120 can be formed from any one or more materials that are functionally compatible with the present invention. In one embodiment, attachment hook 120 can optionally be formed of one or more materials that provide the attachment hook with sufficient flexibility, such that it can bend without breaking. For example and not in limitation, attachment hook 120 can be formed of one or more metals or metallic compositions, including but not limited to steel, aluminum, tin, copper, etc., including known and apparent compositions thereof. In an environmentally conscious aspect, attachment hook 120 can be formed from discarded garment hangers. Further, such one or more materials can allow attachment hook 120 to deform such that second portion 122 straightens or otherwise bends, for example and not in limitation, if the hook is snagged on an underwater structure and an operator pulls on extension element 130 with a force greater than about 10 pounds, for example and not in limitation. This particular aspect can allow release weight 100 to be dislodged by an operator.

In another exemplary aspect, first portion 121 can be fixed to weighted element 110 in any functionally compatible manner desired, including but not limited to any one or more of the following: first portion 121 can be fixed within, around, and/or through weighted element 110; first portion 121 can be disposed through a channel existing through weighted element 110 with or without the first portion's terminal portion being bent so as to provide a fixing abutment, first portion 121 can be provided with threads and can either engage complementarily shaped threads within weighted element 110 or pass at least partially through weighted element 110 and engage a complementarily shaped nut. As illustratively shown in FIG. 1, first portion 121 can be disposed and securably held within weighted element 110 by molding the weighted element with first portion 110 disposed within the weighted element. As noted above, a terminal portion 121a of first portion 121 can be bent to form an angle (such as a 90° angle, for example and not in limitation) to assist in maintaining such attachment.

As illustrated in FIG. 2, second portion 122 can be connected to first portion 121 and create an angle therebetween of between 0 and 360°. Notably, in use, second portion 122 can be passed through the jaw portion of a fish 140 being submerged in a body of water 200. Accordingly, second portion 122 can be provided with a terminal end 122a having a sharp point to facilitate its passing through the jaw of fish 140, but can alternatively be provided a flat point to reduce the risk of injury to a user.

As second portion 122 can pose a risk of injury, according to another exemplary aspect of the present invention, release weight 100 can optionally include a safety ring 123.

Figure 3A:
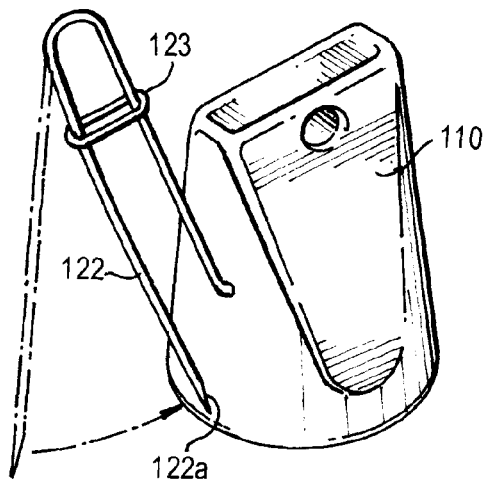
FIG. 3a illustrates an exemplary release weight having an optional safety ring disposed over the first and second portions of an attachment hook to bias the second portion towards the weighted element.

As illustrated in FIG. 3a, safety ring 123 can be disposed around the first and second portions 121, 122 of attachment hook 120 to bias the second portion towards weighted element 110, when release weight 100 is stored or otherwise not in use. Notably, the extent of such bending can optionally bend second portion 122 such that its terminal portion is significantly close or even flush against weighted element 110.

Figure 3B:
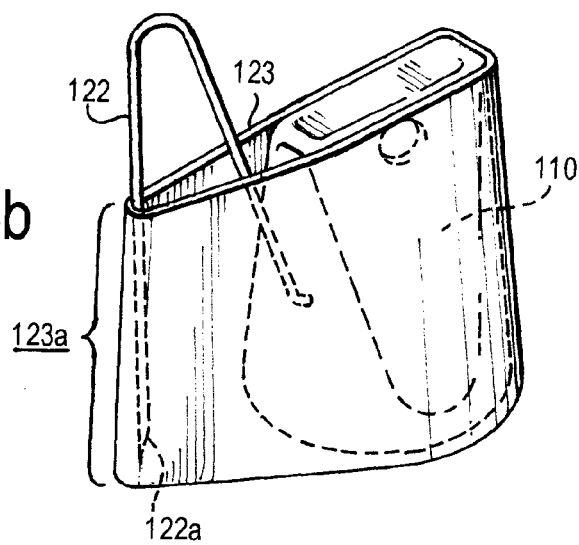
FIG. 3b illustrates an exemplary release weight having an optional safety ring having an elongated side and being disposed over a weighted element and a second portion of an attachment hook.

Alternatively, as illustrated in FIG. 3b, safety ring 123 can be provided with elongated sides 123a, such that the safety ring can be disposed around second portion 122 and weighted element 110, such that it covers terminal end 121a. Notably, FIG. 3b illustrates safety ring 123 as having a form-fitting shape corresponding to the shape of release weight 100; however, safety ring 123 can be provided with any functionally compatible shape desired, such as cylindrically shape, for example and not in limitation.

Figure 4:
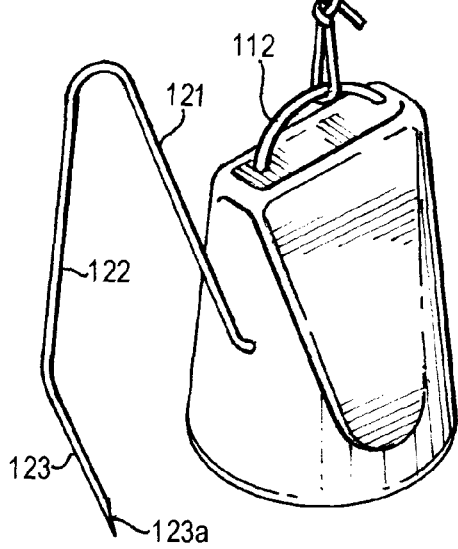
FIG. 4 illustrates an exemplary release weight having an attachment hook with first, second, and third portions.

FIG. 4 illustrates an exemplary release weight 100 with an exemplary attachment hook 120 having first, second, and third portions 121, 122, 123, with the first and third portions being at least substantially parallel. Notably, third portion 123 can include a terminal end 123a, with the third portion and terminal end functioning and interacting with other aspects of the present invention like terminal end 122a. Accordingly, terminal end 123a can be pointed or flat, and can be disposed through a jaw of a fish like terminal end 122a.

In another exemplary aspect of the present invention, an extension element 130 can include any desired structure connected to release weight 100 and allows a user to lower and raise the release weight. For example and not in limitation, any form of rope, string, rod, etc. can be utilized, and notably, need not be per se rigid or flexible, as long as the same allows an operator to lower the release weight 100 and pullably retract it after the release of a fish. For example and not in limitation, extension element 130 can be provided as fishing line.

In still another exemplary aspect of the present invention, extension element 130 can be fixed to weighted element 110 in any desired manner functionally consistent with the present invention, such as tying, welding, gluing, clamping, wrapping, etc. For example and not in limitation, as illustratively shown in FIG. 1, weighted element 110 can include a connection element provided as an eyelet 111 formed therethough, with extension element 130 being fixed thereto in any desired functionally compatible manner, such as tying the extension element thereto. Alternatively, as illustrated in FIG. 4, a connection element can be provided as a bar 112 molded therein or otherwise attached thereto. Accordingly, extension element 130 can be connected to bar 112 via tying or any other functionally compatible manner with or without typical fishing hardware, such as a snap. Notably, unlike prior release elements which require an extension element to be attached to an attachment hook, the present invention provides for attachment of extension element 130 to weighted element 110, which can allow a "pendulum" motion that can facilitate the releasing of a fish from attachment hook 120. With a fish attached to attachment hook 120, an operator can pull and quickly release extension element 130, which can cause weighted element 110 and attachment hook 120 to swing upwardly, and then downwardly, such that second portion 122 can be parallel with an underwater ground surface. Accordingly, with a fish in its natural orientation (the length of its body being parallel to the underwater ground surface), an enhanced release position of second portion 122 (or third portion 123, if so provided) can be achieved.

In yet another exemplary aspect of the present invention, any element of the present invention can be formed from any desired one or more materials that are functionally consistent with the present invention as described and/or claimed. For example, and not in limitation, such a material can include a metal, a plastic, a rubber, a crystalline material, a naturally-occurring material, a man-made material, etc. Therefore, it should be noted that any exemplary material or materials described herein are to be construed as exemplary and illustrative, and not restrictive in a strict sense.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claim.

Therefore, I claim:

1. A release weight for returning a fish having a jaw to a floor of a body of water, said release weight comprising:
   a weighted element having a flat bottom portion and a top portion having a connection element;
   an attachment hook having a first portion, connected to said weighted element, and having a terminal portion, and a second portion, connected to the first portion, and configured to pass through the jaw of the fish, the terminal portion, being bent at an angle, and embedded horizontally within a side wall of said weighted element to attach to attach said attachment hook to said weighted element; and
   an extension element connected to the connection element;
   wherein when said attachment hook is passed through the jaw of the fish and the fish is placed in the body of water, the weighted element and the fish sink to the floor such that the flat bottom portion is flatly positioned on the floor with said extension element extending upwardly to a point above the body of water, and the attachment hook is disengaged from the fish.

2. The release weight of claim 1, wherein said attachment hook is u-shaped.

3. The release weight of claim 1, wherein said weighted element has a rounded side portion.

4. The release weight of claim 1, wherein said weighted element has a rounded top portion.

5. The release weight of claim 1, further comprising a safety ring, wherein said safety ring is disposed around the first and second portions of said attachment hook and biases the second portion towards said weighted element.

6. The release weight of claim 1, further comprising a safety ring, wherein said safety ring is disposed around the second portion and said weighted element and biases the second portion towards said weighted element.

7. The release weight of claim 1, further comprising a safety ring, wherein the second portion includes a pointed terminal end, and said safety ring is disposed around the second portion and said weighted element and covers the terminal end.

8. The release weight of claim 7, wherein the safety ring includes at least one elongated side.

9. The release weight of claim 1, wherein the attachment hook includes a third portion, connected to the second portion, and parallel with a length of said weighted element.

10. The release weight of claim 9, wherein said attachment hook is u-shaped.

11. The release weight of claim 9, wherein said weighted element has a rounded side portion.

12. The release weight of claim 9, wherein said weighted element has a rounded top portion.

* * * * *